F. X. GOVERS.
PROCESS OF DESICCATING MILK.
APPLICATION FILED NOV. 12, 1904.
939,495.
Patented Nov. 9, 1909.
3 SHEETS—SHEET 1.
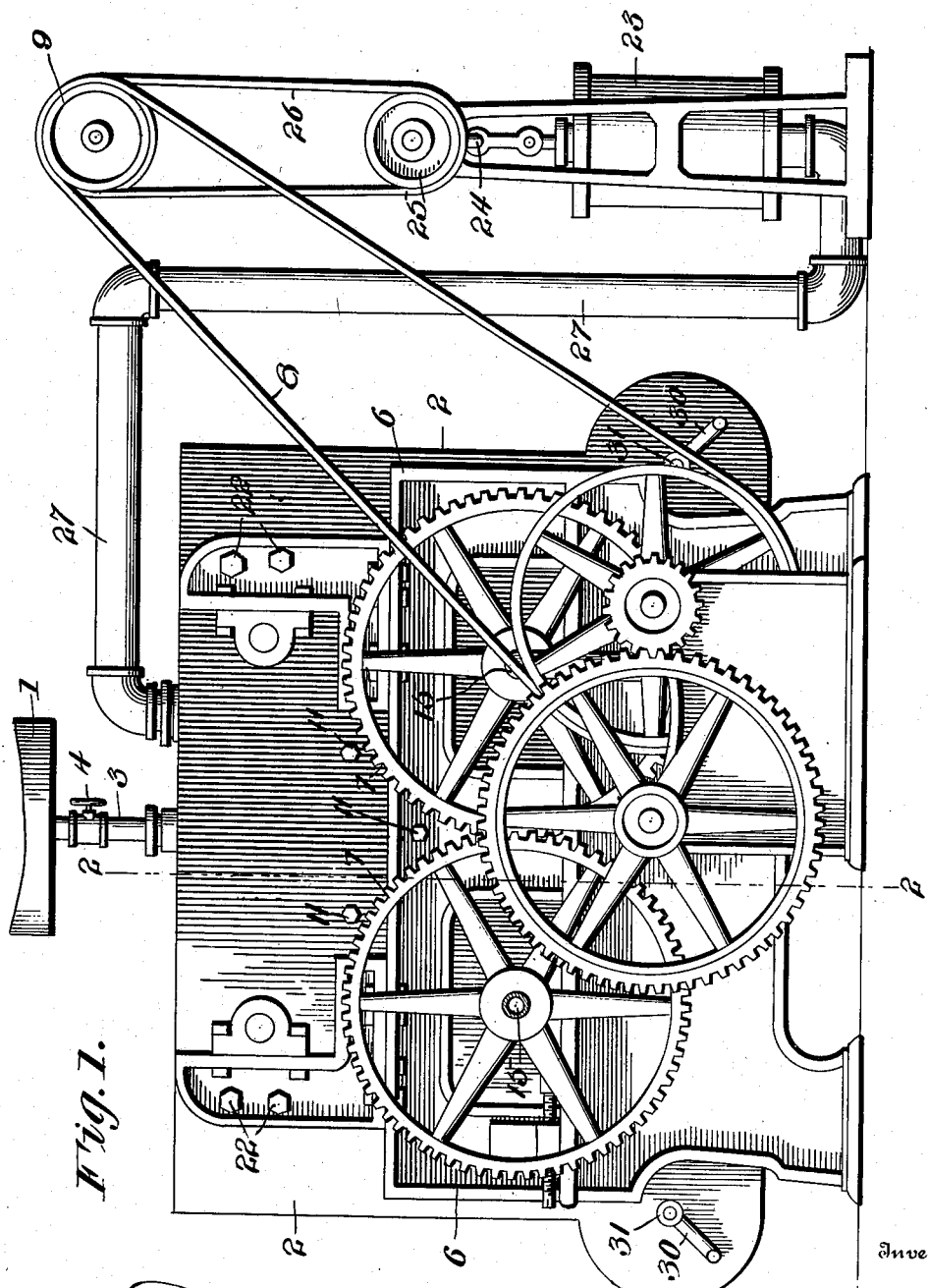

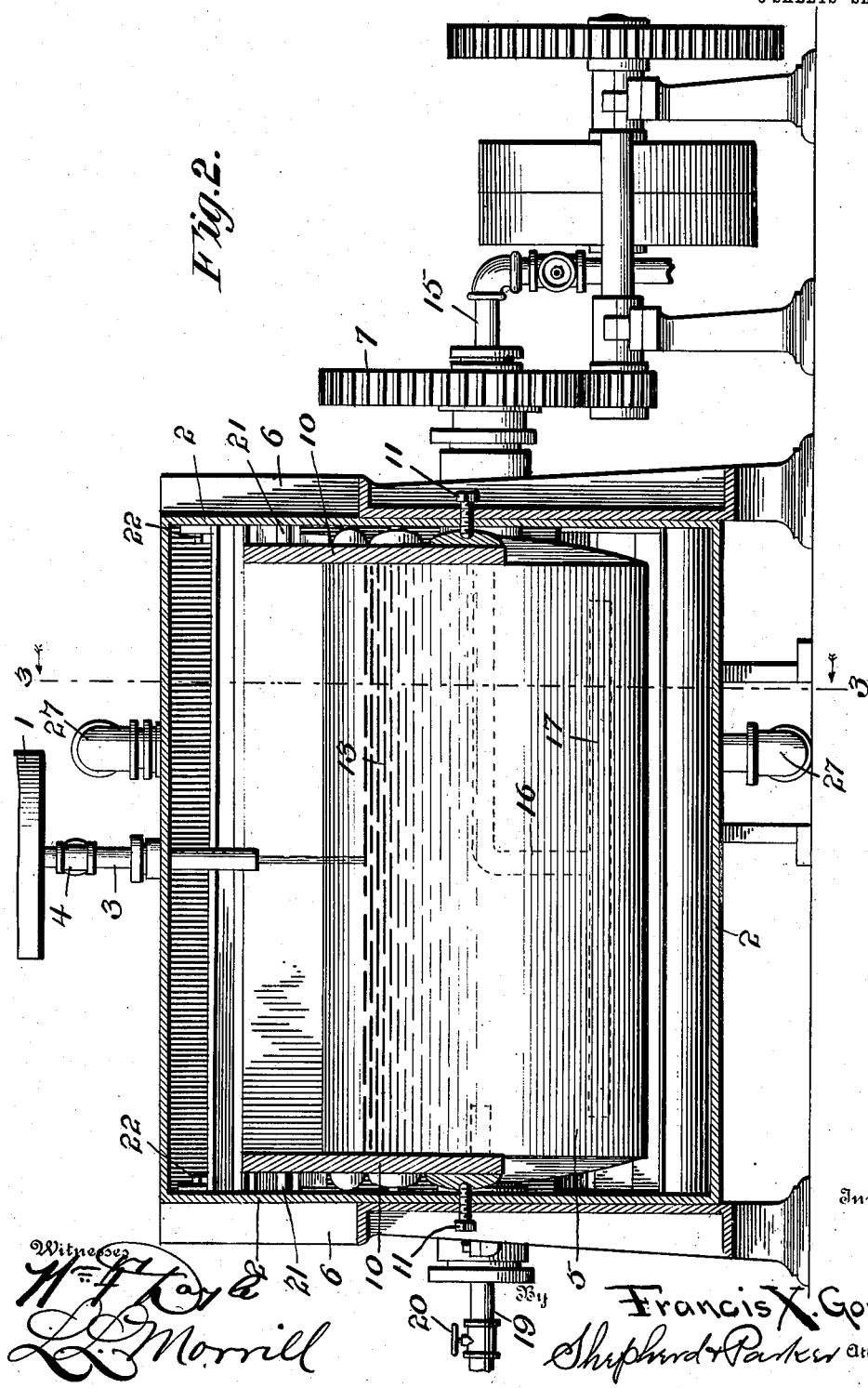

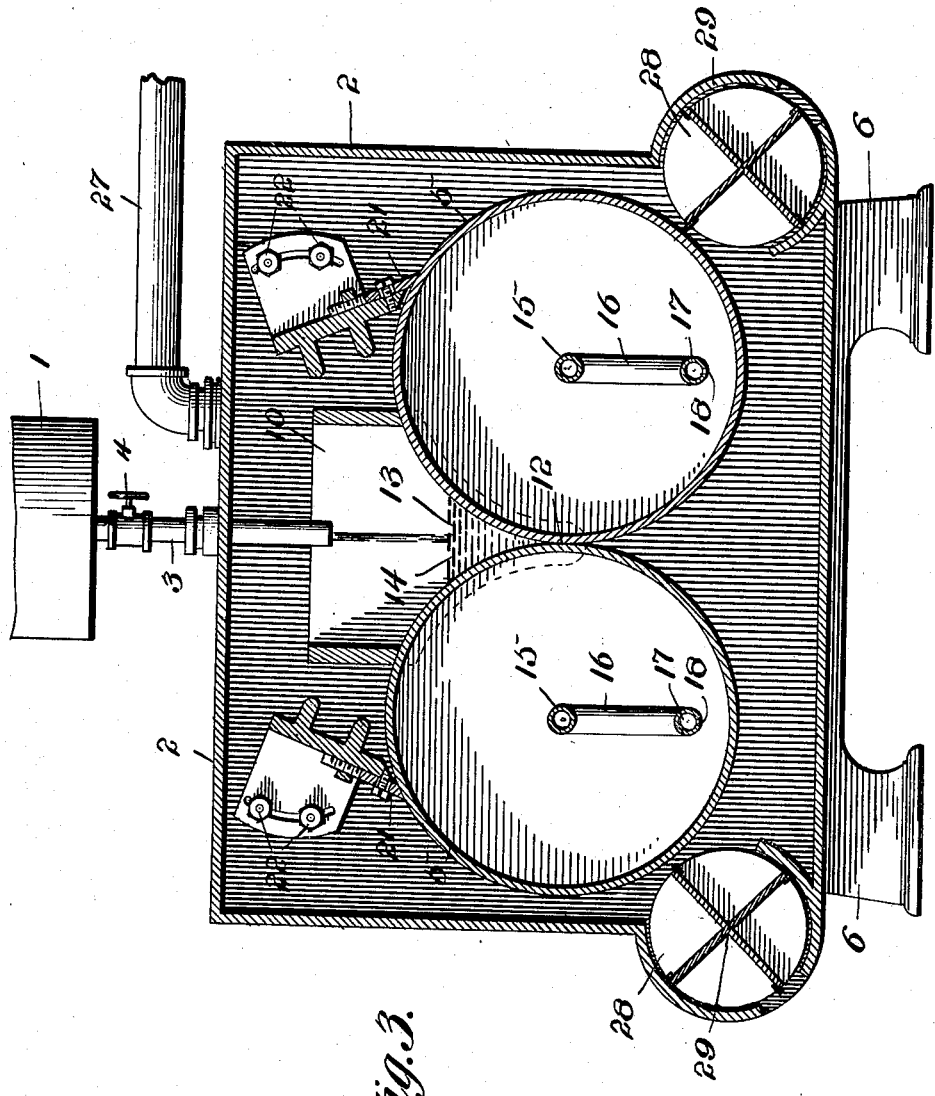

UNITED STATES PATENT OFFICE.

FRANCIS X. GOVERS, OF OWEGO, NEW YORK.

PROCESS OF DESICCATING MILK.

939,495.  Specification of Letters Patent.  Patented Nov. 9, 1909.

Application filed November 12, 1904. Serial No. 232,517.

*To all whom it may concern:*

Be it known that I, FRANCIS X. GOVERS, a citizen of the United States, residing at Owego, in the county of Tioga and State of New York, have invented new and useful Improvements in Processes of Desiccating Milk, of which the following is a specification.

This invention relates to the treatment of milk for the purpose of reducing the same to a dry state and has for its object the production of a desiccated milk which contains all the solid ingredients of milk in substantially their native condition and which upon the addition of water will be readily restored to milk which is practically identical with the fresh untreated material.

It is essential in the practice of my invention in its best embodiment to avoid so changing the chemical character of any of the ingredients of milk that their solubility in water will be diminished or their peptogenic properties, color, smell or taste altered or any change made in the milk which will prevent the desiccated product from producing, upon the addition of a suitable amount of water, a milk indistinguishable from untreated milk.

It is known that milk contains ingredients which are highly sensitive to the various agencies of chemical change. For example, the albumen of milk begins to coagulate at a temperature of about 160° F. Between 100° and 155° F. the milk sugar is very rapidly changed into lactic acid, the range of temperature noted being highly favorable to the action of ferments. The milk sugar and the proteid constituent of milk are slowly altered by the oxygen of the air at a temperature of above about 120° F. producing a deposit or precipitate which ordinarily takes the form of a film or skin on the surface of the milk and on the inner walls of the containing receptacle. The proteid constituent of milk loses its peptogenic properties as well as its property of swelling at a temperature of 212° F.

The efforts of early investigators in the field of milk desiccation were largely directed to condensing the milk at a temperature of considerably below 212° F. to avoid detriment to the solubility and peptogenic properties of the proteid constituent but the action of the ferments on the milk sugar is so rapid at the temperature employed that milk sours before it can be concentrated by the methods of evaporation used. In order to render the concentration more rapid, heated air has been blown through the milk during its evaporation but the oxidizing action of the air on ingredients of the milk not only diminishes their solubility but produces a precipitate of insoluble material during the process of concentration. No way having been found to overcome the practical difficulty encountered in the attempts to produce a soluble milk powder having the peptogenic properties of fresh milk, at a relatively low temperature, efforts have been made to desiccate milk at a temperature above 212° on the theory that diminishing the solubility and peptogenic properties of the milk ingredients is less detrimental in milk condensation than the result of the action of the ferments and air on the milk at the relatively low temperature above referred to. These efforts in the direction of improving the high temperature process of milk condensation have been directed principally to lessening the time required to evaporate the soluble portion of the milk so that the alteration in the solubility and the digestibility of the milk ingredients will be as slight as possible.

I have discovered a process of desiccating milk which is free from the disadvantage of both the low temperature and the high temperature methods and which produces a whole dry condensed milk which is readily soluble in water producing a milk practically indistinguishable from the fresh milk and which is as readily digested as such untreated milk.

In the practice of my said process whole or skim-milk is first freed from some of the water contained therein by being boiled violently in small quantities at diminished atmospheric pressure and at a relatively low temperature and is then rapidly dried by exposure under diminished atmospheric pressure in a thin film or sheet to a temperature sufficiently high to rapidly effect the complete desiccation of the milk.

In the accompanying drawings is illustrated the apparatus which I prefer to employ in carrying out my new process. It will be understood however, that other apparatus may be employed as the process depends in a less degree for its successful practice on the form of apparatus used than on the principle of action of such apparatus.

Figure 1, in the drawing, is an end elevation showing the pump used to remove air and moisture from within the evaporating or vacuum chamber. Fig. 2 is a longitudinal sectional view on line 2—2 of Fig. 1 showing the wall of the vacuum chamber cut away and showing one of the evaporating cylinders and a small quantity of partly desiccated milk between the cylinders. Fig. 3 is a transverse sectional view looking in the direction indicated by the arrow and showing especially the air excluding trap for removing the desiccated milk from the vacuum chamber.

Like characters of reference designate corresponding parts throughout the several views.

The milk to be desiccated is stored in any convenient reservoir 1 and is conducted into the vacuum chamber 2 through the pipe 3. The flow of the milk through the pipe 3 is controlled by the cock 4. Within the vacuum chamber 2 are rotatably mounted a pair of hollow metal cylinders 5 suitably journaled in a frame-work 6 located without the said chamber 2 and provided with suitable stuffing boxes to permit the trunnions to pass through the walls of the chamber without admitting air therethrough. The cylinders 5 are mounted for rotation by means of suitable gearing 7 acting upon the external ends of the trunnions and operated by a suitable belt 8 from a line shaft 9 or other convenient source of power. Suitable plates 10 disposed within the vacuum chamber are adapted to bear against the opposite ends of the cylinders 5 and the degree of pressure of said plates against the cylinders is controlled by suitable means as the set-screws 11. The cylinders 5 are adapted to practically contact at a point 12, on a line connecting the axes of said cylinders. The plates 10 bearing against the opposite ends of the cylinders 5 form with the said cylinders, a receptacle 13 to receive and retain a small quantity of the milk to be desiccated, as shown at 14. The trunnions of the cylinders 5 are hollow and pipes 15 provided with suitable stuffing boxes pass through the hollow trunnion at one end of the machine and within the hollow cylinders 5. Intermediate the ends of the cylinders 5 the pipes 15 are provided with depending vertical portions 16 and horizontally disposed portions 17 connected therewith and extending laterally approximately throughout the length of the cylinders. The horizontal portion 17 is provided with a plurality of openings 18 formed within the lower side thereof. A pipe 19 is passed through a stuffing box within the hollow trunnion at the opposite end of the cylinders 5 and is provided with a cock 20. Scrapers 21 are disposed to bear against the cylinder 5 and are suitably secured to the walls of the vacuum chamber 2 as by bolts 22.

To exhaust air and vapor from the vacuum chamber 2, a pump 23 is provided which may be operated by a crank 24 upon pulley 25, receiving motion from line shaft 9 by means of belt 26. The pump 23 is connected with the vacuum chamber 2 as by pipe 27. A four wing valve 28 within a suitable seat 29 formed in the casing 2 is provided to permit the removal of the desiccated product from the apparatus without admitting any considerable amount of air to the vacuum chamber. The valve 28 may be rotated by a crank as 30 located without the vacuum chamber and connected to the valve by means of shaft 3 passing through the walls of the casing and provided with a suitable stuffing box.

In carrying out my new process in its preferred embodiment, the atmospheric pressure within the vacuum chamber is reduced until water will boil therein at a temperature of about 157° F. and water at a somewhat higher temperature is admitted through pipes 15 into cylinders 5, where after passing through openings 18, it comes into contact with the inner surface of the cylinder walls. When the cylinders 5 have become filled with the water, a cock 20 is regulated to permit the passage of water through the pipe 19 and sufficient water is passed therethrough to hold the temperature of the outer surfaces of the cylinders at the desired point preferably between 155 and 165° F. Milk is now admitted to the receptacle 13 from the storage tank and upon coming into contact with the hot walls of this receptacle boils violently under the diminished pressure and a portion of the water is rapidly evaporated, producing a partially condensed milk, which is then thoroughly desiccated as hereafter described. Fresh milk is admitted continuously as rapidly as the evaporation of the water takes place, the flow of milk being regulated by the cock 4 in accordance with the rapidity of evaporation, which is governed by the degree of vacuum in the evaporating chamber and by the temperature of the rolls. It is desirable to admit the fresh milk to the receptacle 13 at a point intermediate the ends of the cylinders 5 to limit as much as possible the escape of uncondensed milk between the cylinders and the end plates 10. The cylinders 5, rotating in the direction indicated by the arrow carry with them upon their surfaces, a thin film of the partially condensed milk which, at the temperature of the cylinder is thoroughly desiccated under the diminished atmospheric pressure by the time it reaches the scrapers 21. As the milk is taken by the cylinders 5 from the narrow lower portion of the receptacle 13, it is obvious that the milk thus withdrawn will be that which is the most completely condensed of any of the milk within the receptacle. When the milk reaches the scrapers it is removed by them and falls into the receptacles formed by the vanes of the four wing valves 28, by the rotation of which valves, it may be removed from the vacuum chamber without destroying the vacuum therein.

In some cases I may add a small quantity of an alkali or an alkaline or alkaline earth salt to the milk prior to condensing it, to facilitate its condensation and to improve the character of the product. This is particularly necessary in the case of milk of excessive or abnormal acidity; when I add sufficient of the alkali or salt to make the milk about neutral. When the addition above mentioned is made, I prefer to employ a salt which is a normal constituent of milk as potassium phosphate or calcium citrate.

The dried milk as it comes from the vacuum chamber is in a sterilized condition and may be passed directly into cans or other receptacles or it may be compressed into tablets.

I have found that by my new process it is possible to produce a dried milk which can be readily reduced to an impalpable powder by any of the means or processes commonly employed in pulverizing grain, pharmaceutical preparation and the like and I prefer to so reduce my product and to market it in the form of an impalpable powder.

Having thus described my invention, what I claim as novel and desire to secure by Letters Patent, is:

1. The process of desiccating milk which consists in rapidly partially condensing the same under diminished atmospheric pressure at a temperature below 212° F., withdrawing portions of the partially condensed material from below the surface thereof and subjecting it in thin masses to heat at a temperature below 212° F., under diminished atmospheric pressure.

2. The process of desiccating milk which consists in rapidly partially condensing the same by boiling it violently by exposure, under diminished atmospheric pressure, to moving heated surfaces, withdrawing the partially condensed material from the bottom of the mass in thin layers or films of uniform thickness upon the said heated surfaces, under diminished atmospheric pressure.

3. The process of desiccating milk which consists in rapidly partially condensing the same by bringing it in small quantities under diminished atmospheric pressure into contact with heated surfaces maintained at a temperature below 212° F. but sufficiently high to produce almost immediate violent ebullition of the whole volume of the milk, withdrawing the partially condensed material from the bottom of the mass in the form of thin layers or films upon moving rollers and subjecting the same to heat at a temperature below 212° F., under diminished atmospheric pressure.

In testimony whereof I affix my signature, in presence of two subscribing witnesses.

FRANCIS X. GOVERS.

Witnesses:
MARTIN E. STINER,
DANIEL J. POTTERTON.